July 14, 1931.  W. O. STODDARD, JR  1,814,644
COMPOSITE MATERIAL
Filed April 9, 1925

INVENTOR
William O. Stoddard Jr.
BY
Johny Harness
ATTORNEY

Patented July 14, 1931

1,814,644

UNITED STATES PATENT OFFICE

WILLIAM O. STODDARD, JR., OF DETROIT, MICHIGAN

COMPOSITE MATERIAL

Application filed April 9, 1925. Serial No. 21,977.

It is the primary object of my invention to provide a composite material adapted for many uses but particularly adapted for use in the construction of artificial leather.

My invention provides for the manufacture of artificial leather from unspun and unwoven materials and permits of the use in the production thereof of lower grades of material than are usually permissible in making materials of this character. It consequently follows that my improved material will be materially cheaper than those made in accordance with present practice.

With the above and other objects in view, my invention consists in the arrangement, combination and construction of the various parts of my improved combination, as well as the method utilized in making the same, as described in the specification, claimed in my claims and shown in the accompanying drawings, in which:

Figure 1:
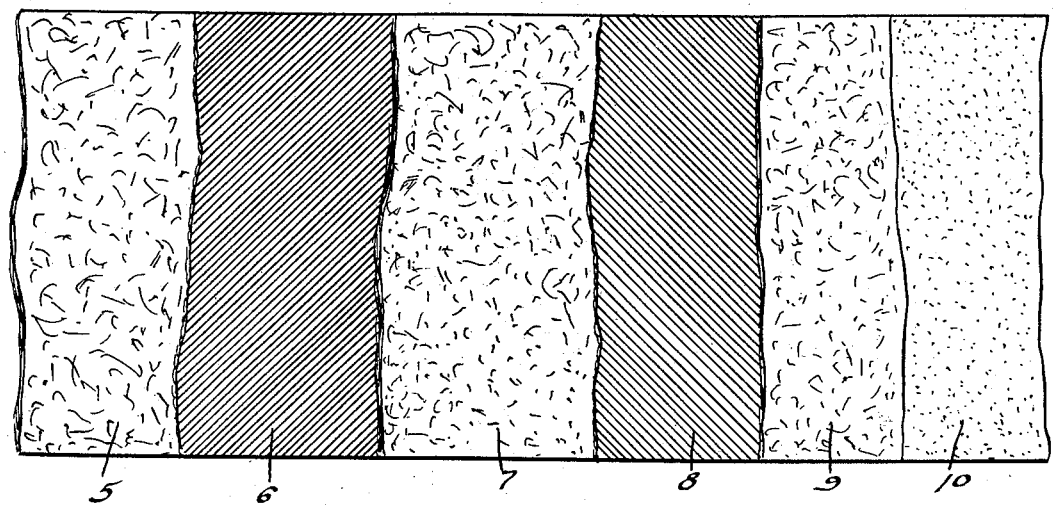
Fig. 1 is a top or plan view of my improved composition with certain parts broken away.
Figure 2:
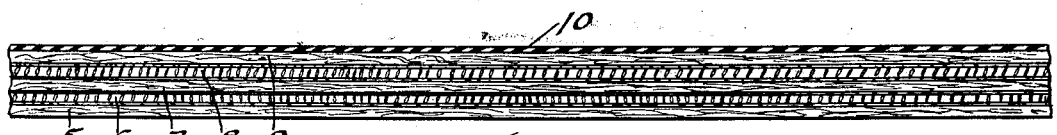
Fig. 2 is a sectional view of the same.

I have shown my improved material as consisting of a layer of cotton 5, upon which is placed a layer of jute or other fibrous material 6 with the fibres extending diagonally across the layer. Upon the layer 6 is imposed another layer 7 of cotton and upon the layer 7 is imposed another layer 8 of jute or other fibrous material with the fibres extending diagonally across the layer and substantially at right angles to the fibres in the layer 6. Another layer 9 of cotton is placed upon the layer 8, and a coating, or coatings, 10 of rubber, pyroxyline or linseed oil compositions, or any of the various well-known compositions utilized in providing artificial leather coatings, is disposed over the layer 9.

All of the various layers of material are cemented together with rubber cement, or any suitable well-known cement.

The laminating of the various layers with the regularly formed strands of fibre intersecting each other provides a very strong and durable composition at a very low cost.

It will be understood, of course, that as many layers of cotton or other fillers, and as many layers of jute or other fibrous materials may be utilized as is desired by the maker to suit the particular need for which the material is to be used.

It will be obvious that various other changes may be made in the arrangement, combination and construction of the various parts of my improved material and the method utilized in making same without departing from the spirit of my invention, and it is my intention to cover by my claims such changes as may be reasonably included within the scope thereof.

What I claim is:

1. As an article of manufacture, a substitute for woven covering materials which consists of a pliable mass composed of a plurality of superposed relatively thin layers of unspun and unwoven flexible fibers having the intervening layers composed of fibers of relatively greater tensile strength than the fibers of the alternate layers, the fibers of said alternate layers being flocculated and the fibers of each of said intervening layers being arranged in substantially parallel relation to each other and diagonally of the mass, said layers being adhesively joined to each other, and a non-fibrous waterproof flexible cover adhesively secured on one side of said mass.

2. As an article of manufacture, a substitute for woven covering materials which consists of a pliable mass composed of a plurality of laminated layers of unspun and unwoven flexible fibers, having the intervening layers composed of unspun and unwoven fibers of relatively greater strength than the fibers of the alternate layers, the fibers in the alternate layers being flocculated and those in each intervening layer being arranged in substantially parallel relation to each other and extending in diverse directions relative to the fibers in the other intervening layers, said layers being adhesively secured together, and a non-fibrous and substantially waterproof covering material adhesively secured to one side of the mass.

3. As an article of manufacture, a substitute for woven covering materials, which consists of a pliable mass composed of a plurality of layers of unspun and unwoven fibers and having the intervening layers composed of fibers of relatively greater strength than the fibers in the alternate layers, the fibers in each of the intervening layers being disposed in substantial parallel relation to each other and extending in diverse directions relative to the fibers in the other intervening layers, said layers having their adjoining surfaces cemented together.

4. As an article of manufacture a substitute for woven covering material which consists of a pliable mass composed of a plurality of layers of unspun and unwoven fibers having the alternate layers composed of flocculated cotton fibers and the intervening layers composed of fibers of relatively greater strength than the cotton fibers, the fibers of each intervening layer being disposed in substantially parallel relation to each other and in nonparallel relation to the fibers of the other intervening layers, the said layers being cemented together, and a substantially waterproof cover adhesively secured to one side of said mass.

5. As an article of manufacture, a substitute for woven covering materials which consists of a pliable mass composed of a plurality of layers of unspun and unwoven fibers, the fibers of every other layer being of relatively greater strength than the fibers in the contiguous layers and being disposed in substantially parallel relation to each other and extending in diverse directions relative to the fibers of the other strong layers, all of said layers being adhesively secured together, and a substantially water-proof cover adhesively secured to the mass.

WILLIAM O. STODDARD, Jr.